Jan. 31, 1967   C. G. JOA   3,301,114
MAT CUTTING MACHINE WITH RECIPROCATING BELT FEEDER
Filed Nov. 25, 1964   6 Sheets-Sheet 5

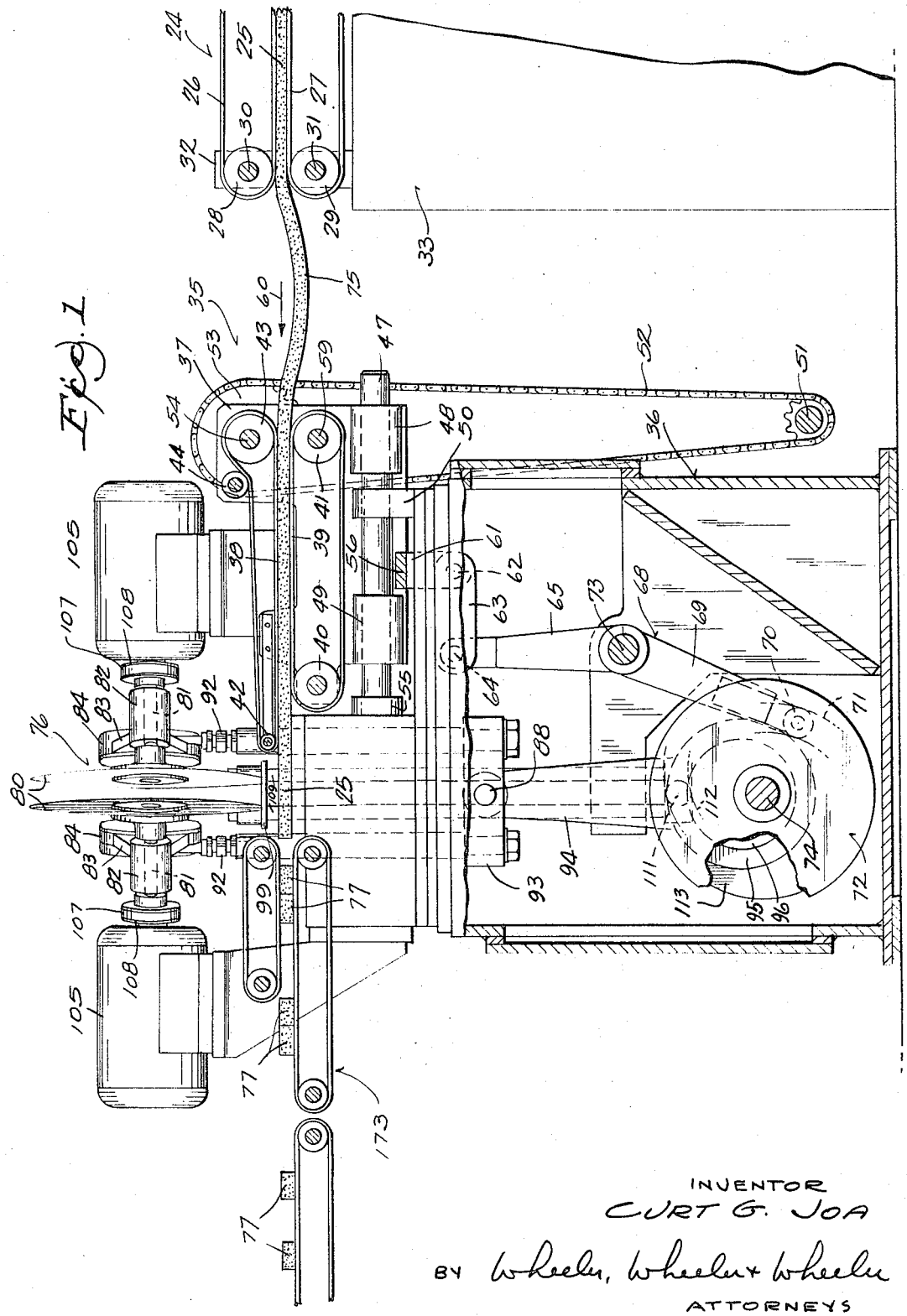

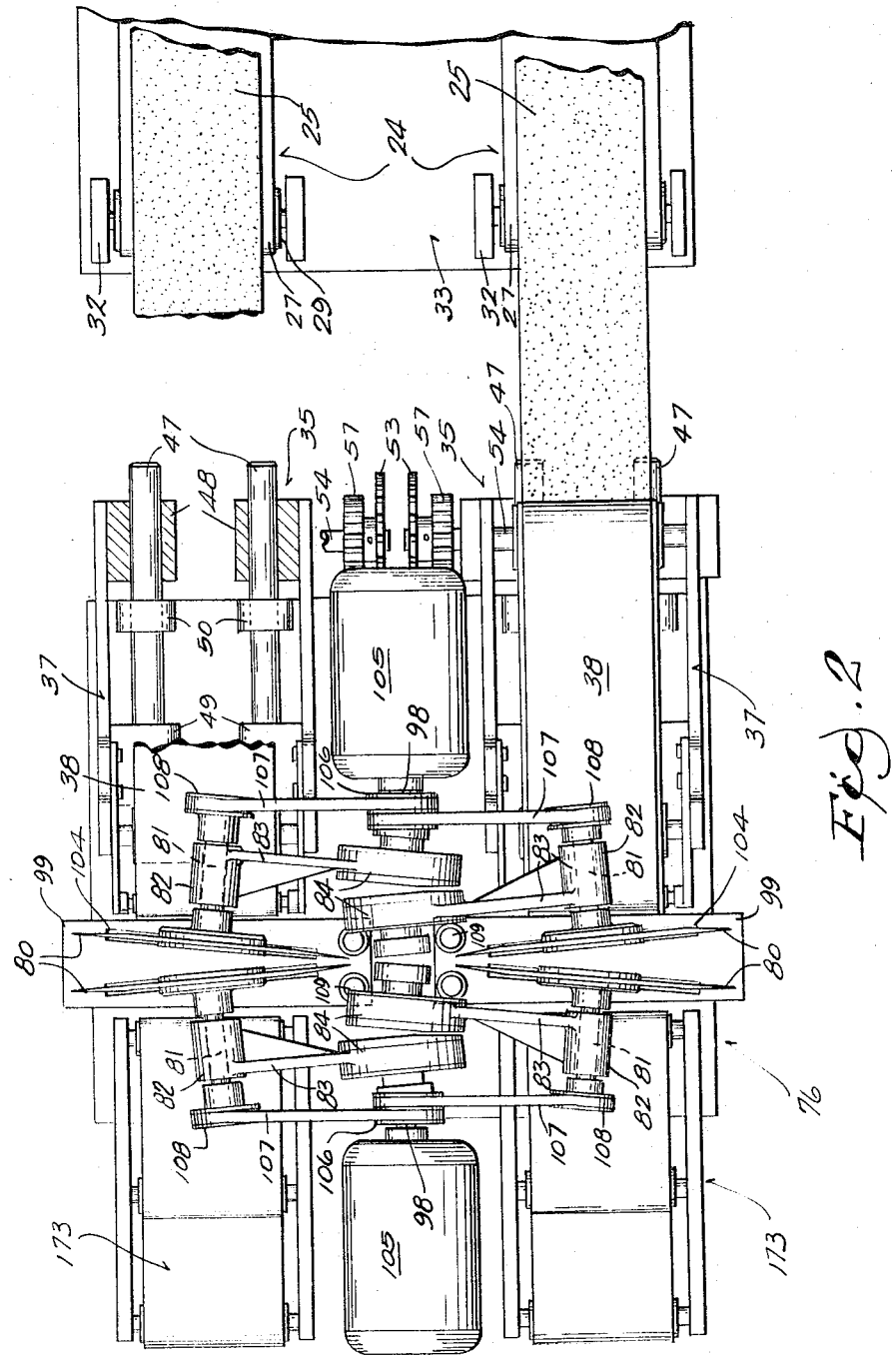

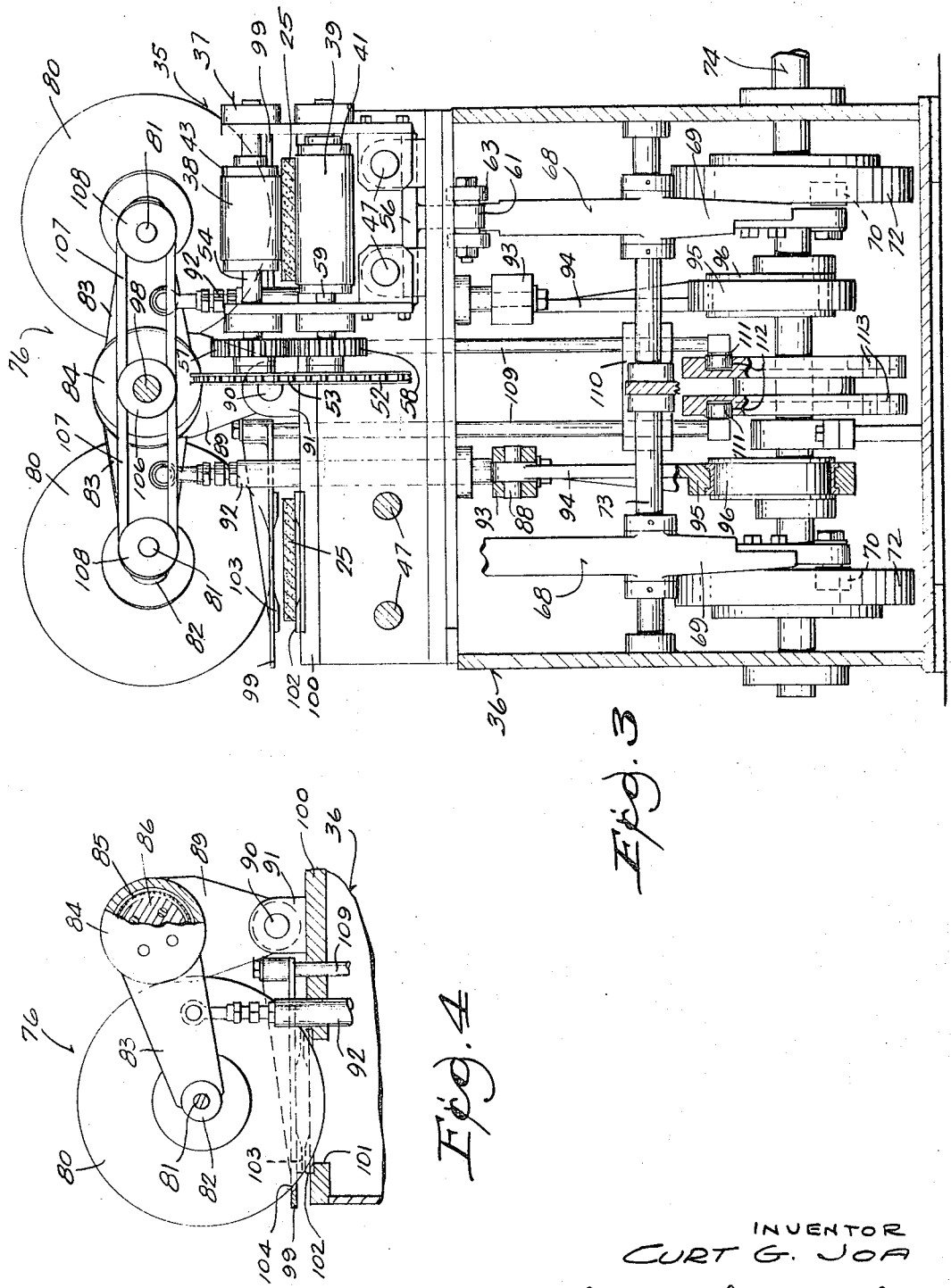

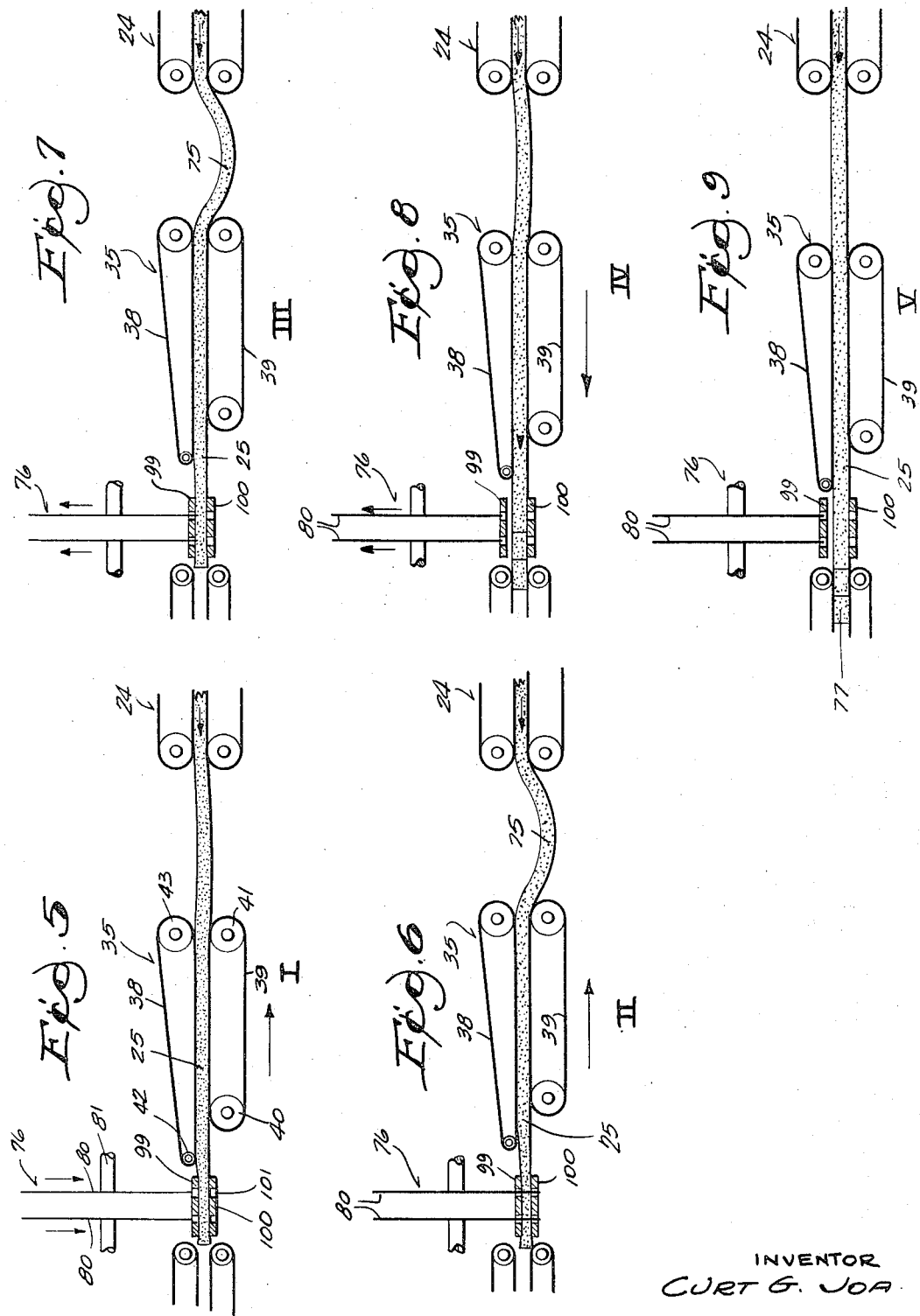

INVENTOR
CURT G. JOA
BY Wheeler, Wheeler & Wheeler
ATTORNEYS

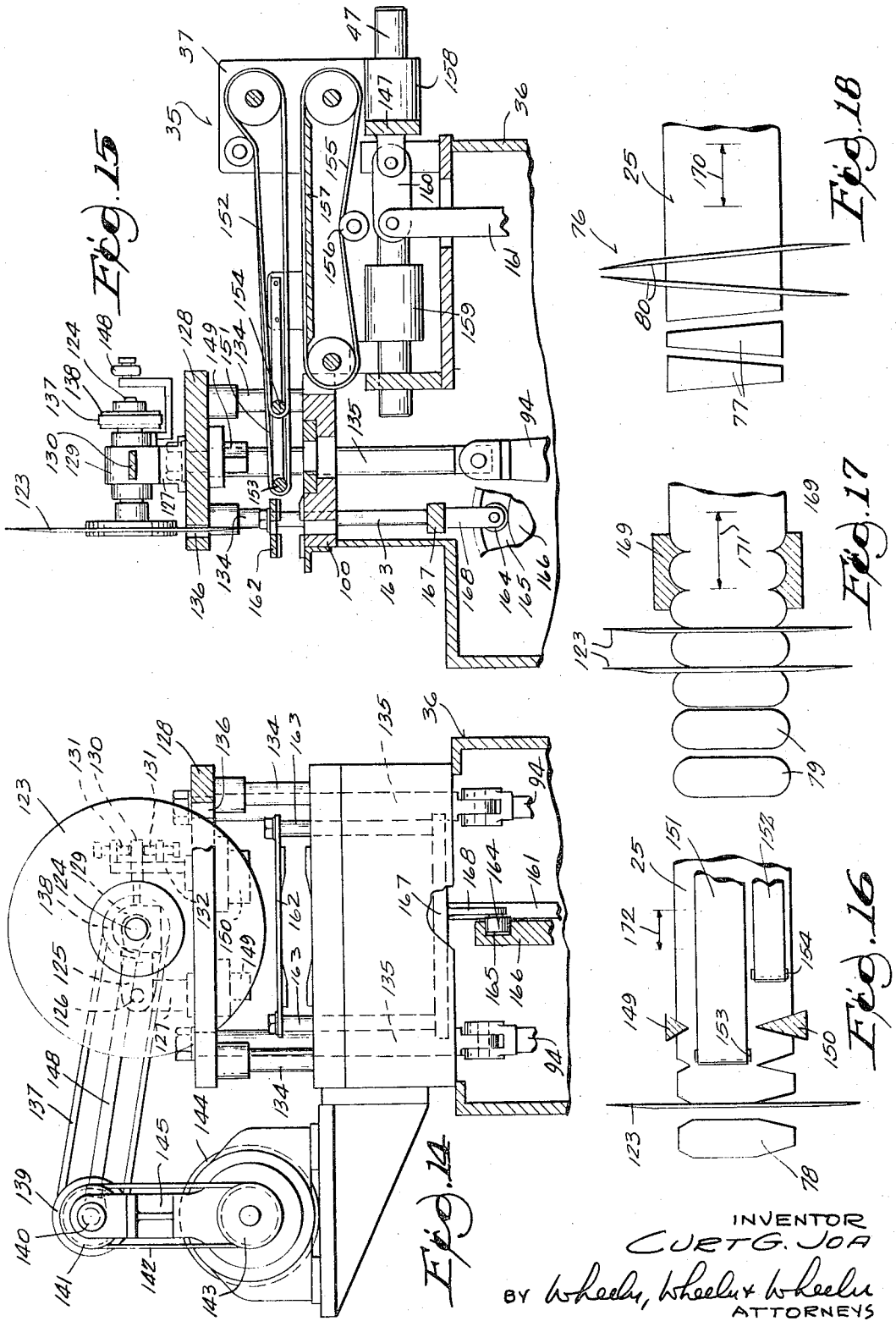

United States Patent Office 3,301,114
Patented Jan. 31, 1967

3,301,114
MAT CUTTING MACHINE WITH RECIPROCATING
BELT FEEDER
Curt G. Joa, Ocean Ridge, Fla.
(Box 1121, Boynton Beach, Fla. 33435)
Filed Nov. 25, 1964, Ser. No. 413,773
8 Claims. (Cl. 83—236)

This invention relates to a mat cutting machine. It particularly relates to such a machine which may be operated at high speeds for high production of pad fillers cut from an elongated continuous mat.

The invention as exemplified in this disclosure relates to a machine intended to produce pad fillers for sanitary napkins. However the invention can be exemplified in other machines.

It is conventional to continuously feed a mat longitudinally of its length and to sever discrete pad filler portions therefrom with severing apparatus which travels with the mat so as not to interrupt the continuous movement thereof. In such conventional apparatus, the cutting mechanism reciprocates on a path parallel to the direction of mat travel, the cutter being advanced laterally toward and through the mat when it is moving with the mat and being elevated thereabove when it is retracted against the direction of mat movement. For example, see my United States Patent 3,020,687.

The inertia and momentum of the cutting apparatus is such that it is difficult to control the reciprocating motion of the cutting apparatus as mat speeds are increased for high production of pads. In accordance with the present invention, the cutting apparatus does not reciprocate or travel with the mat. It simply has a lateral movement toward and away from the mat. This eliminates the problem of coping with inertia and momentum of a cutting apparatus which reciprocates in the direction of mat travel.

In accordance with the present invention, the mat is still fed continuously, but a belt feeder having a reciprocating belt carrier is provided adjacent the cutting apparatus. This feeder has a reciprocating motion in the direction of mat elongation. It alternately holds the mat stationary with respect to the cutter during the cutting cycle and feeds the mat past the cutter at an accelerated rate during the non-cutting cycle. The belts on the feeder operate continuously to feed the mat in its direction of elongation. To hold the mat stationary beneath the cutter, the entire carrier on which the belts are mounted is moved in the direction opposite that to which the belts tend to advance the mat and at the same speed, thus to hold the mat stationary as aforestated.

The inertia and momentum of the mat feeder is much less than that of the cutting mechanism. This is particularly true where the cutter comprises power operated rotary blades or the like. Accordingly, it is much easier to start and stop the belt feeder and to hold the mat stationary with respect to the cutter than it is to start and stop and control travel of the cutting mechanism.

Timing mechanism is provided for the timed coordination of the cutter and the belt feeder carrier so that the cutter is advanced to sever the mat into discrete pad portions when the mat is stationary and is free of the mat when the mat advances past the cutter. In the disclosed embodiment, this comprises a cam shaft, cams, and cam followers.

Other objects, features, and advantages of the present invention will appear from the following disclosure in which:

FIGURE 1 is a side elevation of a machine embodying the invention, portions broken away and shown in section.

FIGURE 2 is a plan view of the machine of FIGURE 1, portions being broken away and shown in section.

FIGURE 3 is an end view of the machine of FIGURE 1, shown partly in section to disclose various details of the machine.

FIGURE 4 is a fragmentary side view of the transport mechanism for advancing and retracting the cutter with respect to the mat, portions being broken away and shown in section.

FIGURES 5 through 9 are diagrammatic views illustrating various steps in the machine cycle.

FIGURE 14 is a fragmentary view showing a modification of the cutter mechanism.

FIGURE 15 is a transverse cross section taken through the modification shown in FIGURE 14.

FIGURE 16 is a diagrammatic view showing the relationship between the cutter blade, notching die, mat and drive belts for the modification of FIGURES 14 and 15.

FIGURE 17 is a diagrammatic plan view of the relationship between a pair of spaced cutting blades, marginal notching die and mat for a further modification of the device.

FIGURE 18 is a diagrammatic view showing the relationship between the cutting blades and mat for the embodiment shown in FIGURES 1 through 4.

Figure 13:
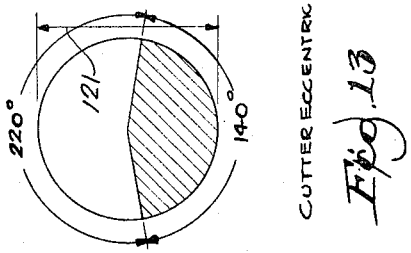
FIGURE 13 is a vector diagram illustrating the period of time during which the cutter is engaged with the mat and the period of time when it is disengaged from the mat.

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

As best shown in FIGURES 1 through 4, two mat or batt strips 25 are conveyed by mat conveyors 24 each having opposed continuously operating belts 26, 27. The respective mats may be fabricated as described in my United States Patent 3,086,253. In the disclosed embodiment they are made of a thickness appropriate for the severing therefrom of pad fillers for sanitary napkins. The strips could be thinner if intended for use as a pad filler for diapers, hospital pads, etc. For purposes of illustration, it may be assumed that the conveyors 24 feed the mats at a speed of 600 inches per minute. The conveyor belts 26, 27 art trained over rollers 28, 29 on shafts 30, 31 mounted on frame 32 supported on table 33. The machine can be adapted to handle any number of strips 25. The disclosed embodiment in which there are two strips is merely for exemplification.

Spaced beyond the discharge point of conveyors 24 is a table 36 on which a pair of mat feeders 35, one for each strip 25, is mounted. Each feeder 35 comprises a carriage 37 provided with an upper mat feeder belt 38 and a lower mat feeder belt 39. The lower belt 39 is trained over end rollers 40, 41 each suitably journaled on the frame 37. Upper belt 38 is trained over end rollers 42, 43 each suitably journaled on the frame 37. Slack in belt 38 may be taken up by the idler roller 44.

Each carriage 37 is mounted for reciprocation in the direction of the elongation of the mat 25 on pairs of guide rods 47. For this purpose, the frame 37 has downwardly depending bearing sleeves 48, 49 which slide on the rods 47. Rods 47 are mounted on table 36 in any convenient manner, for example, on brackets 50, 55.

Belt rollers 43, 41 are driven from drive shaft 51 through chain 52 which engages with sprocket 53 mounted on the shaft 54 of roller 43. Gears 57, 58 respectively connected to shafts 54 and 59 drive the rollers 41, 43 and the belts 38, 39 thereon.

The mat or batt strips 25 are frictionally engaged between the belts 38, 39 and will be driven in the direction of arrow 60 at the lineal speed at which the belts 38, 39 are driven. In the foregoing example, this lineal speed will be 600 inches per minute.

The carriages 37, however, are mounted for reciprocation on the rods 47, alternately to move in the direction of arrow 60 and against the direction of arrow 60. For this purpose, each carriage 37 is provided with a cross piece 56 and a depending drive bracket 61 which is coupled on pivot pin 62 to a link 63. Link 63 in turn is pivoted on pin 64 to upwardly extending arm 65 of a bell crank 68 centrally pivoted to the frame 36 on pin 73 and having another arm 69 with a laterally projecting cam follower roller 70 engaged in a laterally open cam slot 71 of cam 72.

Cam 72 is mounted on a cam shaft 74 which functions as a timer by which all machine operations are coordinated. As will hereinafter be explained, each carriage 37 reciprocates toward and against the direction of arrow 60 in the displacement pattern shown in FIGURE 10. The slot 71 is so shaped as to produce this pattern.

Figure 11:
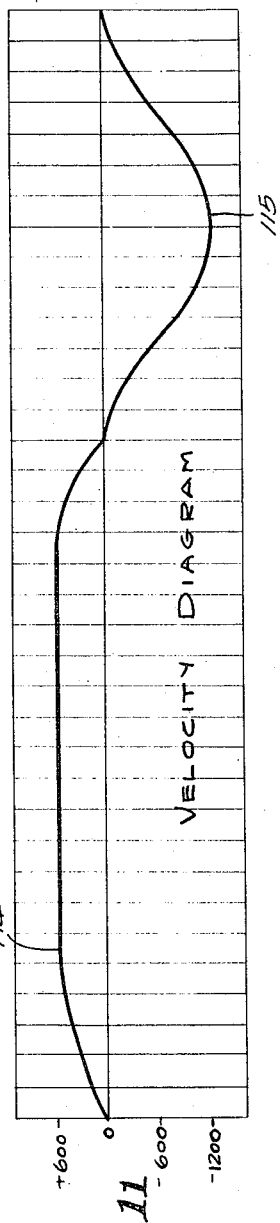
FIGURE 11 is a velocity diagram relating the velocity of the reciprocating mat feeder to the angular position of the cam shaft.

Each mat 25 will periodically develop more or less slack, as shown at 75, in the space between its infeed belt conveyor 24 and its reciprocating feeder carriage 37. Infeed conveyor 24 supplies mat at a constant rate of 600 inches per minute. The rsepective belts 38, 39 also feed the mat at a constant rate of 600 inches per minute in the direction of arrow 60. When the feeder units 35 are at standstill, the mat will be fed past the cutter unit 76 at the same 600 inches per minute. However, when the feeder carriage 37 is moving against the direction of arrow 60 at a constant lineal rate of 600 inches per minute, the feed rate of the belts 38, 39 in the direction of arrow 60 will be exactly balanced. Accordingly, the net mat feed will be zero, and the mat will be held stationary with respect to the cutter unit 76. When the feeder carriage 37 is moved in the direction of arrow 60, its feed rate will be added to the feed rate of the belts 38, 39, thus to move the mat past the cutter unit 76 at a speed greatly in excess of 600 inches per minute. As shown in FIGURE 11, this rate may be as high as 1200 inches per minute, in the foregoing example.

The cutter units 76 shown in FIGURES 1 through 4 of the instant drawings are specifically designed to produce tapered discrete pad fillers 77 as shown in FIGURE 18. These are intended as pad fillers for tapered sanitary napkins. Pad fillers such as shown at 78 is FIGURE 16 and 79 in FIGURE 17, may also readily be produced on machines embodying the present invention. These different pad shapes are produced by modifications in the cutter unit to be hereinafter described.

In the embodiment shown in FIGURES 1 through 4 which produce the tapered pad filler 77, there are two circular cutting blades or saws 80 for each mat strip 25. The respective cutter blades 80 may have toothed or knife edges. They are power rotated at high speed so as to sever the mat without compressing the fluff. Blades 80 are mounted on shafts 81 having bearings 82 respectively supported on swing arms 83. As best shown in FIGURE 4, the arms 83 have hubs 84 rotatably mounted on antifriction bearings 85 on concentric hubs 86 of swing links 89. The swing links 89 are pivotally connected on pins 90 to bracket ears 91 on the support frame 36. As best shown in FIGURE 2, the axes of the various pivots for the arms and links ar slightly inclined to the direction of mat elongation, thus to dispose the blades 80 at appropriate angles to produce the tapered pad fillers 77 shown in FIGURE 18.

The respective cutter blades 80 are concurrently advanced and retracted with respect to the mat 25 by stems 92 which have their lower ends respectively connected on cross heads 93. Cross heads 93 are connected on pins 88 to pitmans 94 having strap followers 95 about the eccentric cams 96 on cam shaft 74. Accordingly, as the cam shaft 74 rotates, the cutter blades 80 will be raised and lowered with respect to the mat 25 in time wtih the advance of the mat by the mat feeders 35.

Stripper clamp plates 99 are provided to clamp against the mat strips 25 when the mat strips are held stationary as aforesaid, thus to hold the mats securely against any dislocating forces produced by the rotating cutter blades 80 and insure that the blades will accurately sever the mat strips and withdraw therefrom with a clean cut.

The table or bed 100 (FIGURE 4) over which the mat strips 25 are fed is provided with slots 101 into which the blades 80 may project downwardly. Table 100 has saddles 102 shaped to clamp against the undersurface of the mat strips 25 when the stripper plates 99 descend against the mat strip. The stripper plates 99 are provided with contoured surfaces or saddles 103 to cooperate with saddles 102 and form the mat into pad shape under pressure of the stripper plate 99. Stripper plates 99 are also provided with slots 104 through which the blades 80 project, on the down stroke thereof, as shown in FIGURE 4.

The respective stripper plates 99 are mounted on vertical stem 109 which project upwardly through guide apertures in the table 100 and connect to the plates 99. At their lower ends, the stems 109 are guided for vertical reciprocation in guide block 110 which is fixed to the frame 36. At their lower ends the stems 109 have laterally projecting cam follower rollers 111 which ride in the laterally open cam track slots 112 of the cams 113 on cam shaft 74.

Blades 80 are continuously driven by electric motors 105. Motors 105 have drive shafts 98 coupled to pulleys 106 for the belts 107 which are trained about driven pulleys 108 on the shafts 81 of the circular saws 80.

Various stages in the cycle of operation of the machine are diagrammed in FIGURES 5 through 12. The cycle is controlled by the timer cam shaft 74 and the various cams mounted thereon, and by which the actions of the stripper plates 99, cutter 76, and reciprocating mat feeder are controlled in timed coordination. Certain typical positions of the parts shown in FIGURES 5 through 9 are related to the diagrams of FIGURES 10 through 12 by the Roman numerals I through V.

Figure 10:
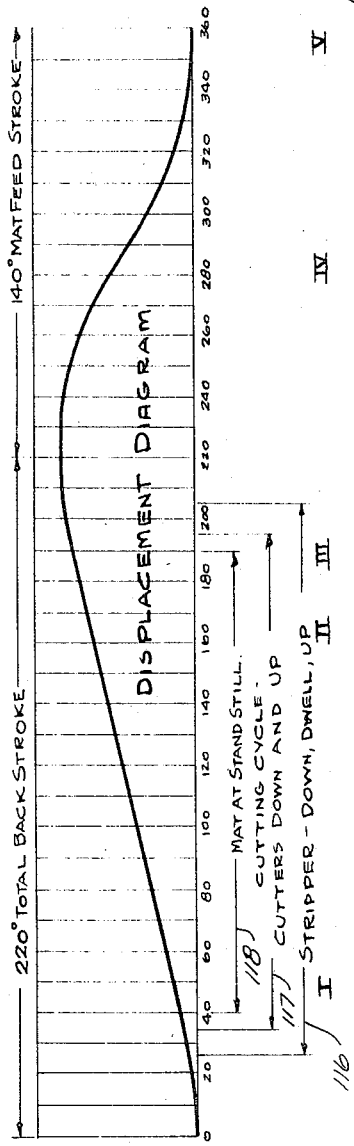
FIGURE 10 is a displacement diagram illustrating the position of the reciprocating mat feeder related to the angular position of the cam shaft.
Figure 12:
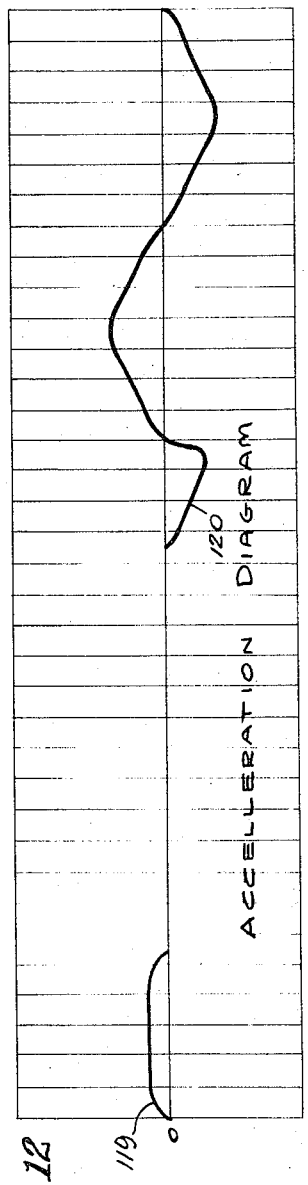
FIGURE 12 is an acceleration diagram relating the acceleration of the reciprocating mat feeder to the angular position of the cam shaft.

FIGURES 10 through 12 are marked off in 10° increments of the entire 360° rotation of the cam shaft 74. As a point of reference, 0° is selected to indicate the position of cam shaft 74 where mat feeder 35 is at its extreme forward position proximate cutter 76 and just starts moving away from cutter 76 against the direction of arrow 60. The cam track 71 in cam 72 is so shaped that it will require 220° rotation of cam shaft 74 before the feeder 35 reaches its extreme rearward position remote from cutter 76. In the next 140° of rotation of shaft 74, the feeder 35 will move forward in the direction of arrow 60 and return to its initial position indicated either at 360° or 0° in FIGURES 10 through 12.

The down cycle for the stripper plates 99 is indicated by the span of dimension line 116 in FIGURE 10. The down cycle of the cutter 76 is indicated by the span of dimension line 117 in FIGURE 10, and the period of time during which the mat is stationary with respect to the cutter mechanism 76 is indicated by the span of dimension line 118 in FIGURE 10. The various cams on cam shaft 74 are so shaped as to produce the cycles as shown in FIGURES 10 through 12. In this connection, note that during the backstroke (0°–220°) of the reciprocating feeder 35, stripper plates 99 will start to clamp the mat at about 25°. At about 35° the blades 80 of the cutting mechanism 76 will first engage the mat. This will be just slightly prior to the 40° point in the cycle at which the mat is first brought to a complete standstill. The mat remains at standstill through a cycle of 150° as indicated by dimension line 118. During this period of time, the reciprocating feeder 35 is moving against the direction of arrow 60 at exactly the same speed that the feeder belts 38, 39 advance the mat in the direction of arrow 60. This is indicated by the flat part of curve 114 in the feeder velocity diagram of FIGURE 11. Accordingly, the net speed of the mat strip is zero. Blades 80 will then cleanly cut the mat strip 25 into the discrete pad portions 77 shown in FIGURE 18.

At about the 190° point in the cycle, feeder 35 will begin to slow down in its rearward movement and the mat 25 will begin to move forward slightly. At about the 195° point in the cycle, blades 80 will be completely withdrawn from the mat 25. At about the 205° point in the cycle, strippers 99 will be entirely unclamped from the mat. At 220° feeder 35 will have reached its rearmost position and will then reverse direction for the remaining 140° of the cycle to advance the feeder 35 in the same direction as its belts 38, 39 drive the mat. During this period of time, all parts of the cutting and clamping mechanism will withdraw and the mat is fed forward.

Typical positions of the parts for various stages of the cycle are shown in FIGURES 5 through 9. Roman numerals I–V inclusive in these figures are keyed to FIGURE 10 to relate these views, as follows:

FIGURE 5, Position I. The mat 25 is clamped, cutter 76 is engaged with the mat and feeder 35 is moving back at the same speed as belts 38, 39 feed the mat ahead, thus to hold the mat stationary.

FIGURE 6, Position II. The feeder 35 nears the end of its backstroke and slack 75 has accumulated in the mat. Cutter 76 has completed its cut.

FIGURE 7, Position III. The cutter 76 is withdrawing. Feeder 35 is at its rearmost position.

FIGURE 8, Position IV. The mat is unclamped, cutter 76 is disengaged, feeder 35 is moving forward, and slack 75 is being taken out of the mat.

FIGURE 9, Position V. The end of the cycle.

The velocity diagram of FIGURE 11 shows the velocity of the feeder 35 at various points in the cycle. Note that during the period of time indicated by dimension line 118 of FIGURE 10, the velocity of the feeder 35 as indicated by curve 114 is uniform. In the example given, the velocity is 600 inches per minute. The velocity drops to zero at 220° stage. During the mat feed stroke of the feeder 25, the velocity may increase substantially about 600 inches per minute, but in the opposite direction as indicated by curve portion 115 in FIGURE 11.

FIGURE 12 diagrams the acceleration of the feeder 35. During the portion of the cycle shown by curve 119, the feeder is accelerating rearwardly. During the portion of the curve shown at 120 the carriage is decelerating rearwardly. Other portions are as indicated.

FIGURE 13 illustrates the fact that the total vertical movement of the saw from fully advanced to fully retracted position is about 4½ inches as is indicated by dimension line 121. The saw is out of engagement with the mat during 220° of the rotation of the saw eccentric cam 96 and engages the mat during 140° of rotation of the cam 96.

FIGURES 14 and 15 illustrate a modification where pads 78 such as are shown in FIGURE 16, are to be produced. For this purpose a single blade 123 is squared with the mat strip 25. The blade 123 is mounted on a shaft 124 supported on one end of a swing arm 125, the other end of which is pivotally mounted on pin 126 to a bracket 127 mounted on elevator platform or plate 128. The bearing 129 for shaft 124 is provided with a laterally projecting lug 130 movably positioned between a pair of adjusting bolts 131 mounted on the bracket 132 which is also mounted on the elevator plate 128. Elevator plate 128 is guided for vertical movement by corner posts 134. The plate 128 is raised and lowered by push rods or stems 135 which function like the stems 92 in the embodiment of FIGURES 1–4. They receive motion from pitmans 94.

Plate 128 has a slot 136 through which the saw blade 123 extends. The saw is driven by belt 137 which is reeved around pulley 138 on saw blade shaft 124 and about a pulley 139 on shaft 140 which also has a pulley 141 about which belt 142 from the pulley 143 of motor 144 is looped. Shaft 140 is mounted on arm 145 which can swing concentrically with pulley 143. The bearings for shafts 140 and 124 are spaced by spanner bar 148. Accordingly, as the cutter blade 123 is moved up and down by the elevator plate 128, the belt drive connections from motor 144 to the blade 123 are free to articulate to accommodate for this movement.

In this embodiment, the underside of the plate 128 is provided with a notcher comprising marginal notching dies 149, 150 which function as shown in FIGURE 16 to notch out marginal portions of the mat strip 25. Accordingly, when the blade 123 severs pad fillers 78 therefrom, the specific tapered shape shown in FIGURE 16 results. In this embodiment the frame 37 of the reciprocating feeder 35 has two top belts 151, 152, instead of the single belt 38 as shown in the embodiment of FIGURES 1–4. One of these belts 151 extends as far forwardly as possible between the notching dies 149, 150, whereas the other belt 152 is somewhat shorter so as not to interfere with notching die 150. As shown in FIGURE 15, belt 151 is trained about idler roller 153 on frame 37 and the belt 152 is trained about idler roller 154 on frame 37. Frame 37 is provided with a lower belt 155 comparable to belt 39 of the embodiment shown in FIGURES 1–4. Belt 155 may have an idler roller 156. Its top run is supported by an apron 157.

The frame 37 in this embodiment is reciprocated in substantially the same manner as in the embodiment of FIGURES 1–4. Support frame or table 36 is provided with guide rods 47. The frame 37 has bearing blocks 158, 159 thereabout. Blocks 158 are connected by cross piece 147 pivotally connected to link 160 and thence to oscillating rocker arm 161 which comprises one arm of a bell crank similar to bell crank 68 of the embodiment shown in FIGURES 1–4.

Stripper plate 162 is raised and lowered by the stems 163 which are substantially the same as the stems 109 shown in FIGURE 3. These stems are cross connected at their lower ends by cross piece 167. An arm 168 projecting downwardly therefrom has at its lower end a laterally projecting roller 164 mounted in the track 165 of cam 166 mounted on the shaft 74.

FIGURE 17 shows another modification in which two cutter blades 123 are in spaced relationship, somewhat similar to the blades 80 as shown in FIGURE 18, except that they are parallel and will produce parallel sided pads 79, instead of tapered pads 77. In this modification, the elevator plate 128 may be provided with a notcher comprising marginal notching dies 169 which will produce pads 79 with the end configuration shown in FIGURE 17.

In the embodiments of FIGURES 1–4 and 18, the mat strip 25 is advanced the distance indicated by dimension line 170 for each cam shaft cycle. This is double the average width of the tapered pad 77. In the embodiment of FIGURE 17, the mat strip is advanced a somewhat greater distance indicated by dimension line 171 for each cam shaft cycle. This is also twice the width of each napkin pad 79. For the modification of FIGURE 16, the mat strip is advanced a much shorter distance for each cam shaft cycle, as indicated by dimension line 172. This distance equals the width of one pad 78. Where only a single cutter blade is used, the mat strip is advanced a distance equal to the width of one pad.

Where a plurality of cutter blades are used, the mat strip is advanced a distance equal to the number of blades multiplied by the pad width.

The fibrous material content of the mat or batt strips 25 is somewhat loosely packed. The belts of conveyor 24 and feeder 35 will tend to keep the mat consolidated and offers support therefor. The mat strips 25 desirably have a paper or like wrapper and may be single or multiple ply, as shown for example in my copending United States patent application Serial No. 184,105, filed April 2, 1962.

The discrete pads are removed from the machine by belt conveyors 173 for further processing.

I claim:

1. A high speed mat cutting machine comprising:
   a belt feeder for feeding an elongated mat in the direction of its elongation,
   a cutter to which the feeder advances the mat and which severs the mat transversely into discrete pad portions,
   transport mechanism for the cutter to move the cutter transversely to the direction of mat elongation and into and out of severing relation to the mat,
   said belt feeder comprising belts constantly driven to feed the mat toward the cutter and a belt carrier movable toward and away from the cutter,
   a reciprocator for imparting reciprocating movement to the carrier, alternately to move it away from the cutter at substantially the same speed as the belts tend to advance the mat toward the cutter, thus to hold the mat stationary with respect to the cutter, and to move it toward the cutter, thus to advance the mat past the cutter at a speed in excess of belt speed,
   a timer for the timed coordination of the cutter transport mechanism and the belt feeder carrier reciprocator by which the cutter severs the mat into discrete pad portions when the mat is stationary and is free of the mat when the mat advances past the cutter.

2. The mat cutting machine of claim 1 in combination with a continuously driven infeeding conveyor for supplying mat to the belt feeder, said infeeding conveyor and belt feeder being spaced apart in the direction of mat elongation whereby slack will be created in the mat in said space when the mat is held stationary with respect to the cutter and said slack is taken up when the mat advances past the cutter.

3. The mat cutting machine of claim 1 in which the timer comprises a cam shaft, cams thereon and cam followers respectively connected to the cutter transport mechanism and to the belt carrier reciprocator.

4. The mat cutting machine of claim 1 in combination with a stripper and means to clamp the stripper to the mat when it is held stationary wtih respect to the cutter.

5. The mat cutting machine of claim 1 in which the cutter comprises a single blade, said reciprocator comprising means to advance the mat a distance equal to the width of each discrete pad portion in each reciprocation of the carrier.

6. The mat cutting machine of claim 1 in which the cutter comprises a plurality of blades spaced apart in the direction of mat elongation to concurrently sever a plurality of discrete pad portions from the mat, said reciprocator comprising means to advance the mat a distance equal to the combined width of said plurality of pad portions in each reciprocation of the carrier.

7. The mat cutting machine of claim 1 in combination with a notcher to form notches in the margins of the mat, and motion transmitting connections between the notcher and cutter transport mechanism for the concurrent operation thereof.

8. The mat cutting machine of claim 1 in which the cutter comprises two blades having different inclinations to the direction of web elongation whereby to sever discrete tapered pads from the mat.

No references cited.

WILLIAM S. LAWSON, *Primary Examiner.*